United States Patent
Hoben et al.

(10) Patent No.: US 7,284,428 B1
(45) Date of Patent: Oct. 23, 2007

(54) SENSOR HOUSING FOR USE IN A STORAGE VESSEL

(75) Inventors: John Charles Hoben, Sugarland, TX (US); Allen Ray Westmoreland, Sugarland, TX (US); Alexander Bukhman, Houston, TX (US); Israel Bukhman, Houston, TX (US)

(73) Assignee: Innovative Measurement Methods, Inc., Sugar Land, TX (US)

( * ) Notice: Subject to any disclaimer, the term of this patent is extended or adjusted under 35 U.S.C. 154(b) by 0 days.

(21) Appl. No.: 11/473,859

(22) Filed: Jun. 23, 2006

(51) Int. Cl.
*G01F 17/00* (2006.01)
*G01F 23/14* (2006.01)

(52) U.S. Cl. ............................ 73/413; 73/292; 73/299; 73/715; 340/612; 340/614; 340/620

(58) Field of Classification Search ................... 73/431, 73/714, 715, 723, 290 B, 299, 291, 292; 340/603, 612, 614, 620
See application file for complete search history.

(56) References Cited

U.S. PATENT DOCUMENTS

| | | | |
|---|---|---|---|
| 4,371,790 A * | 2/1983 | Manning et al. ............. | 307/118 |
| 4,377,550 A * | 3/1983 | Tokarz ........................ | 376/245 |
| 4,631,961 A * | 12/1986 | Yohe et al. ................. | 73/866.5 |
| 4,739,786 A * | 4/1988 | Parkinson ...................... | 137/2 |
| 4,967,592 A | 11/1990 | Lagergreen et al. | |
| 5,086,403 A | 2/1992 | Slocum et al. | |
| 5,156,042 A | 10/1992 | Carlin et al. | |
| 5,469,249 A | 11/1995 | Magyar, Jr., et al. | |
| 5,706,857 A | 1/1998 | Dowling, Jr. et al. | |
| 5,813,480 A * | 9/1998 | Zaleski et al. ................ | 175/40 |
| 5,942,980 A | 8/1999 | Hoben et al. | |
| 5,986,756 A | 11/1999 | Slater et al. | |
| 6,227,302 B1 * | 5/2001 | Pringle et al. .............. | 166/374 |
| 6,230,822 B1 * | 5/2001 | Sullivan et al. .............. | 175/40 |
| 6,233,374 B1 * | 5/2001 | Ogle et al. .................... | 385/13 |
| 6,401,045 B1 | 6/2002 | Rogers et al. | |
| 6,571,886 B1 * | 6/2003 | Sullivan et al. .............. | 175/40 |
| 6,719,068 B2 * | 4/2004 | Jonsson ....................... | 175/19 |
| 6,817,227 B2 | 11/2004 | Thompson et al. | |
| 6,834,544 B2 * | 12/2004 | Scott et al. ................... | 73/149 |
| 6,915,686 B2 * | 7/2005 | Baustad ................... | 73/152.46 |
| 6,974,054 B2 | 12/2005 | Hutchinson | |
| 7,066,280 B2 * | 6/2006 | Sullivan et al. .............. | 175/40 |
| 7,241,369 B2 * | 7/2007 | Van Hoorn ................. | 204/416 |
| 2003/0164240 A1 * | 9/2003 | Vinegar et al. ............. | 166/372 |
| 2006/0096105 A1 * | 5/2006 | Haugland .................... | 33/304 |

OTHER PUBLICATIONS

"MTG Multi-Function Tank Gauge", Gauging Systems, Inc., 2002, pp. 1-20.*
"IMMI-MTG Multi-Function Tank Gauge", Innovative Measurement Methods, Inc., 2002, pp. 1-13.*

* cited by examiner

*Primary Examiner*—Hezron Williams
*Assistant Examiner*—David A. Rogers
(74) *Attorney, Agent, or Firm*—Buskop Law Group, P.C.; Wendy Buskop

(57) ABSTRACT

A detection apparatus for use in a vessel for measuring a fluid includes a tubular connected to a housing containing sensors, wherein the housing includes a top, a bottom, and a hole disposed in the top of the housing. The housing containing sensors includes an outer surface and a sloped inner surface sloping from the outer surface toward a central axis of the housing and intersecting with the hole. In one embodiment, two or more housing containing sensors can be included with detection apparatus. A pressure sensor, having a diaphragm flush mounted in the sloped inner surface, can be disposed in the hole. Signaling device can be disposed in the hole for communications between the sensors and a processor. The processor receives data from the sensors and converts the data to values for transmission to an auxiliary device.

16 Claims, 4 Drawing Sheets

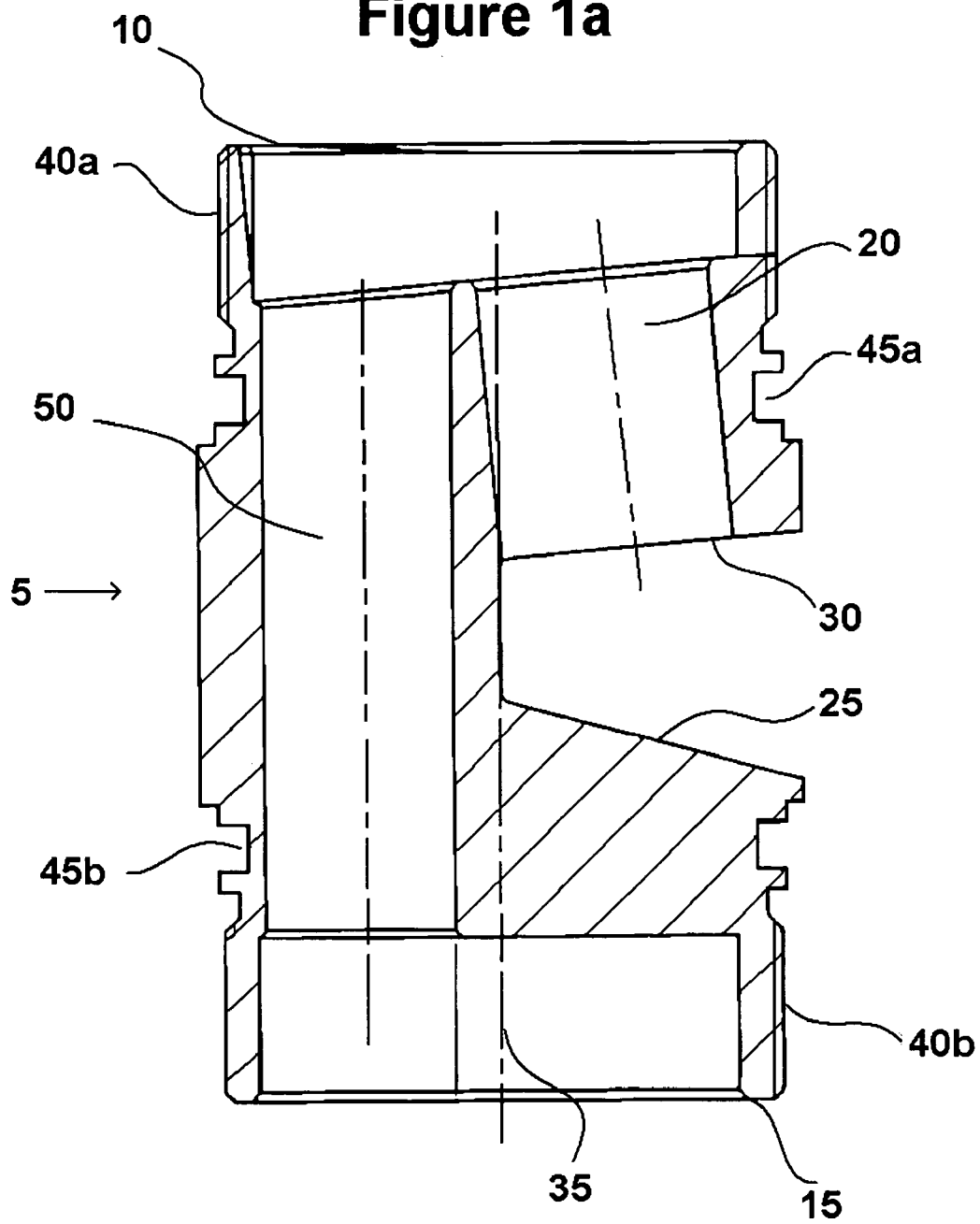

SENSOR HOUSING FOR USE IN A STORAGE VESSEL

FIELD

The embodiments relate to detection apparatus for use in vessels to measure state properties of contained fluids.

BACKGROUND

Large storage tanks are used to store hydrocarbon-based fuels and other products for future use. In many cases, these tanks are arranged close to one another to form tank farms. Probe assemblies and other detection and monitoring devices can be installed within or onto the tank to monitor the amount of fluid in the tank as well as the changes in conditions or state properties of the fluid, itself. However, many of the existing monitoring and detection devices are limited in their ability to compensate for changes in the storage tanks, such as bulging of the walls of the tank. In addition, many existing devices perform sequential measurements for monitoring state properties of the fluids which can create problems in consistency and accuracy of values.

A need exists for a highly sensitive monitoring and detection apparatus that is easy to manufacture, easy to install, and has the ability to function using synchronized sensing devices for increased accuracy in measurements.

A need exists for a detection and monitoring apparatus that can attach to tanks, to a floating roof, or to sides of a vessel or tank without being affected by a floating roof's and a tank's walls movement without necessity of wall penetration. Further, a need exists for a detection and monitoring apparatus that can attach as described while taking into account requirements of environmental laws, such as by not violating environmental laws and by providing data about emissions.

A need exists for a probe with multiple sensors for hydrostatic tank measurements and hybrid method, measurements such as multiple temperature and multiple pressure measurements, in which the sensors can perform synchronized measurements for increased accuracy and consistency with regard to measurement values.

The embodiments meet these needs.

BRIEF DESCRIPTION OF THE DRAWINGS

The detailed description will be better understood in conjunction with the accompanying drawings as follows:

FIG. 1a depicts a cross-sectional side view of an embodiment of a housing for a detection apparatus for use in vessels for measuring state properties of contained fluids.

FIG. 1b depicts a top view of the embodiment depicted of FIG. 1a.

FIG. 2b depicts a top view of the embodiment depicted of FIG. 2a.

Figure 1B:
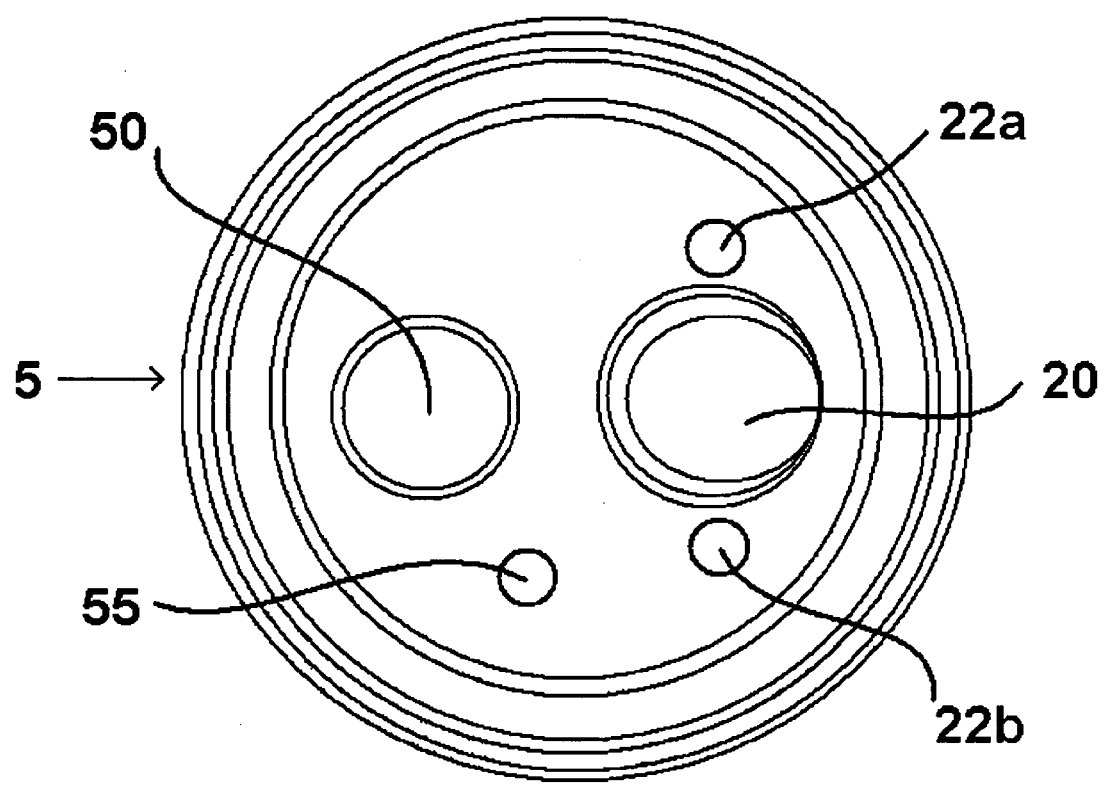

The embodiments are detailed below with reference to the listed Figures.

DETAILED DESCRIPTION OF THE EMBODIMENTS

Before explaining the embodiments in detail, it is to be understood that the embodiments are not limited to the particular embodiments, and that they can be practiced or carried out in various ways.

The embodiments relate to detection apparatus with a sensor housing for use in vessels to measure state properties of contained fluids. The fluids that can be monitored and measured in a vessel include: liquids, gases, and combinations thereof, such as vapors which can be hydrocarbon based vaporous gases. The vapors can results from the gas or the liquid. Other example of fluids that can be monitored and measured can include water, wine, beer, gasoline, oil, pharmaceuticals, another hydrocarbon, a benzene, other organic chemicals, alcohol, acid, esters, inert gases, and vapors thereof.

The embodied apparatus can be attached to different types of vessels, such as tanks, storage vessels, vats, container trucks, barrels, or other storage containers. The vessels can be structures with or without floating roofs.

The embodiments of the detection apparatus for use in vessels includes a tubular member that can be connected to a housing. The tubular member can be composed of a durable material, such as machined stainless steel tubular member, plastic, or a metal alloy such as, Hastelloy-C, Teflon, or aluminum can also be used for the tubular member. Examples of other materials include Kynar, composites, ceramic composites, metal alloys, and formed polymer blends such as PVC.

The embodied apparatus includes a housing containing sensors for engaging the tubular member. The housing can be made of the same type of materials. The housing and the tubular member can be composed of different materials. The housing and the tubular member can have the same diameter and can have the same kind of similar shape.

The embodied apparatus can include a sleeve joined to the tubular member. The sleeve is adapted to engage the second tubular member to accommodate large sized objects for monitoring. The sleeve enables customers to monitor large tanks without the extra cost of adding more housings. An extended detection apparatus can be formed by the addition of a sleeve, two or more housings containing sensors, and the electronics head.

As an example, the detection apparatus with the housing and attached tubular member can have a length from about one foot to over eight feet in length. The detection apparatus can be made from two or more housings containing sensors connected together with a signaling device to communicate with the processor or can be made with the addition of sleeves. An advantage of the detection apparatus is that numerous sensors can be used with only one processor. Detection apparatus is an assembly of two or more sensor housings with connected tubular members and the electronics. A single tubular member with sensor housing can be one foot minimum and 10 foot maximum. A detection apparatus as a whole can be from 3 feet to 300 feet and beyond depending upon the use.

The housing includes a housing top, a housing bottom, an outer surface, and a sloped upper surface sloping from the outer surface toward a housing axis. The outer surface can include a seal to provide a leak-proof, engagement between the housing and the tubular member. The detection apparatus can comprise a sloped lower surface for encouraging easy escape of fluids from the housing. This secondary sloped surface can be a smooth-walled surface, and is positioned below the sloped upper surface. Further, the embodied detection apparatus can include a mounting hole that is parallel to the vertical axis of the housing, wherein the mounting hole is adapted to receive a strain relief fastener.

The housing top includes a hole disposed through the surface of the housing top, wherein the hole is at an angle to the housing axis. The angle can range from about 0.001 degrees to about 30.0 degrees as measured from the housing axis. The hole intersects with the sloped upper surface.

The housing bottom and top is adapted to engage a second tubular member. As an example, the housing bottom can include threads disposed on the outer surface for engaging the second tubular member.

The hole in the housing can be adapted to fit one or more sensors. The sensors can be disposed in the wall of the hole and flush mounted with the sloped upper surface. The housing can include additional holes for additional sensors. The sensors can be pressure and temperature sensors. The holes sizes for the sensors can vary since temperature sensors can be different in diameter than pressure sensors.

The pressure sensors can include a diaphragm flush mounted in the sloped upper surface. All of the sensors are connected to or transmit to signaling means. Synchronized sensors' processing provides for simultaneous monitoring and measuring of the fluid, in real-time, to provide a higher level of accuracy and consistency for fluid measurements and flow calculations than other detection devices.

The embodied detection apparatus easily enable the monitoring and comparison of atmospheric or ambient temperatures and pressures outside the vessels to temperature and pressure readings for vapors inside the vessels to provide data and alarms regarding: the formation of extreme pressures and temperatures, the formation of vacuums, and the emissions of harmful amounts of hydrocarbons and other potentially harmful chemicals. In one embodiment, a portion of the detection apparatus has sensors that extend above the roof of the vessel to monitor ambient pressures and temperatures. Another portion of the detection apparatus has sensors that extends into an interior of the vessel below the roof for monitoring vapor pressures and vapor temperatures to provide data and notifications. The embodied detection apparatus can be a probe that goes from the bottom of the tank and through the roof on the top. An additional sensor can be located above the roof to compare the pressure or temperature with one or more sensors positioned below the roof in order to monitor the gauge pressure below the roof for excessive pressure and emissions calculations when necessary.

The embodied detection apparatus can utilize synchronized sensors. Sensors are spread from the bottom to the top of the detection apparatus for synchronous and continuous monitoring and measuring. The synchronization of the sensors can be established using a clock or timed device with the processor, even internal to the processor, to synchronize sensors, electronic switches and signals, A-D converters, and other equipment connected to the detection apparatus for increased accuracy. The data can be simultaneously compared in order to obtain a better real-time picture and to provide a higher accuracy of readings and measurements for the contained fluids. For example, fluid density can be particularly difficult to measure in a moving fluid without using synchronized data since sequential measurements can be altered or can include errors due to the changes in the moving fluid or the vessel that are occur between the timed intervals for the measurements.

The signaling means can be disposed above the hole or holes or can be included in the holes in addition to the sensors. The signaling means communicate sensor data from the sensors to a processor in proximity to the housing top.

The processor can be connected to the top of the tubular. The processor comprises memory for receiving sensor data from the signaling means or from synchronous sensors. The processor can include a clock, and wherein the clock is used to synchronize the measurements taken from sensors by processor.

The apparatus can include a locking integrity bag disposed over the processor.

The processor can convert the sensor data to one or more values using computer instructions stored in the memory. The values can provide a reading or notification of a measurement or calculation flow pertaining to the contained fluid, such as a change in the fluid level or fluid volume as a result of a leak. Examples of values calculated by the process include fluid mass, fluid volume, fluid density, fluid temperature, fluid level, fluid impurity content, and combinations thereof. For example, a mass of a fluid can be a few tons to hundreds of thousands of tons of crude oil in an oil tank farm. Fluid volume can range from tens of barrels to millions of barrels of liquid petroleum gas. Fluid density can range from 0.5 grams/cc to 2 grams/cc or more for most petroleum products. Temperature of the fluid can range from −60C to plus 200C and can include vapor temperatures, not just liquid temperature measurement. Impurity of the fluid can be the detection of water in oil on a percentage basis.

An embodiment of the detection apparatus can monitor and compare the measurements for atmospheric or ambient pressures and temperatures to the measurements for vapor pressures and vapor temperatures to provide data with notifications and/or alarms. Examples of these types of data include extreme pressures, extreme temperatures, the formations of vacuums, or high amounts of hydrocarbon emissions, or other harmful chemical emissions from the vessel. Immediate notifications and alarms can be produced to provide an alert of potentially harmful gases, liquids, and vapors that are escaping into the atmosphere and surrounding area.

The embodied apparatus utilizes sensor data that is received by the processor continuously for real-time and immediate value calculation.

The processor or processors transmit one or more values to an auxiliary device. Examples of auxiliary devices include a remote terminal unit (such as, a Bristol Babcock RTU for tubularline monitoring); a distributive control system (such as, a Honeywell DSC 3000); a supervised control and data acquisition (SCADA) system (such a, a Human Machine Interface system); a computer (such as, a PC); a tank gauge interface unit (such as, 1515 ETGI provided by Gauging Systems, Inc., of Houston, Tex.); and similar type devices. The process can transmit the values to a transceiver, such as a radio transceiver, a satellite, a cellular transceiver, or other similar type transceivers.

Establishing of a common reference point in addition to using synchronized multiple sensors by locating the detection apparatus in or next to an actual manual gauge well provides measurements and flow calculations to be made with greater accuracy. The common reference point used in conjunction with synchronized multiple sensors can eliminate the errors found in sequential readings from physical changes in the fluid or the vessel. The embodiments, therefore, provide a significant advancement in the accuracy of measurements and readings for properties of fluids contained in a vessel.

The embodied apparatus can include one or more channels substantially parallel to a vertical axis of the housing. The channel can contain signaling wires to convey sensor data from a second housing to the processor. This channel can be smooth walled and can enable continuous communication of the sensors from one housing to a second connected housing for communications with the processor. As an example, the signaling wires in the channels can be multi-conductor wire (such as provided by Belden), wires, or some similar type of communication device (such as fiber optic or cable).

In one embodiment, the detection apparatus can be installed into or in proximity to a gauge well or gauge hatch of a large vessel, such as an oil tank, so that uncertainties caused by comparison with manual gauging due reference point movement or bottom movement of the vessel are eliminated.

By locating the detection apparatus with the gauge well of the vessel, the detection apparatus can provide multiple measurements at one location and greatly increase the accuracy of a monitoring function. With this alignment, the detection apparatus can measure automatically all the values that are measured manually from the gauge well so that comparisons can be made of many variables at the same time the manual samplings by the gauge well are occurring. Examples of samplings and measurement values include: changes in a fluid level, temperatures of the fluid, fluid density, and a percentage of water content in a hydrocarbon fluid. Tank samplings and measured values include: level and temperature of the fluid and fluid density. The alignment of the detection apparatus with the gauge well of the vessel allows the measured values from the detection apparatus to be compared and calculated with the manual gauge well samplings and readings and dramatically improves the verification ability and consistency of the measurement values.

Safety and environmental benefits for this detection apparatus include improvements to accuracy of readings and measurement values with regard to the emissions of hydrocarbons and other possibly harmful chemicals.

The embodied detection apparatus rests on the bottom and can alternatively supported by the upper most portion of a vessel. A magnetic foot can be used for mounting the embodied detection apparatus on sloped bottoms.

Referring now to the figures, FIG. 1a depicts a cross-sectional side view of an embodiment for a housing of a detection apparatus. The detection apparatus can be used on a vessel to measure state properties of contained fluid. FIG. 1b depicts a cross-sectional top view of the embodiment depicted in FIG. 1a. The housing (5) includes a top (10) and a bottom (15) with a hole (20). FIG. 1a further depicts a seal grooves (45a and 45b) on the exterior for a seal to provide a leak-proof, engagement between the housing and the tubular member. As exampled, the housing (5) can connect to a tubular member using threaded engagements (40a and 40a).

The housing (5) includes an outer surface and a sloped upper surface (30). The sloped upper surface (30) can slope from the outer surface toward the central axis (35) of the housing. The sloped upper surface (30) intersects with a hole (20) of the housing enabling a pressure sensor's diaphragm to be flush mounted in the sloped upper surface (30). A sloped lower surface (25) can be formed in the housing opposite the sloped upper surface for easy escape of fluids from the housing.

As exampled in the figures, the hole can be centrally disposed in the top (10) and parallel to a central axis (35) of the housing (5). As exampled, the hole (20) can be a smooth-walled aperture with a typical diameter of ⅝ inch. The range in diameter for the hole can be generally from about 0.5 inches to about 5.0 inches with a length from about 0.5 inches to about 10.0 inches. For example, a typical ¾ inch diameter hole formed in the housing can have a length of about 1.0 inch. In FIG. 1a, the hole (20) is shown extending from the top (10) through to the sloped upper surface (30).

As an example, the sloped upper surface (30) can be sloped at an angle of from about 0.001 degrees to about 30.0 degrees from the imaginable surface perpendicular to the central axis (35) of the housing. As exampled in FIG. 1a, the sloped upper surface has an angled slope of 5.0 degrees from the central axis. The slope of the sloped upper surface should be adequate for fitting one or more sensors within the interior of the housing for data detection, readings, and measurements. The hole and the slope can be adapted to accommodate both a pressure and temperature sensor.

Figure 2A:
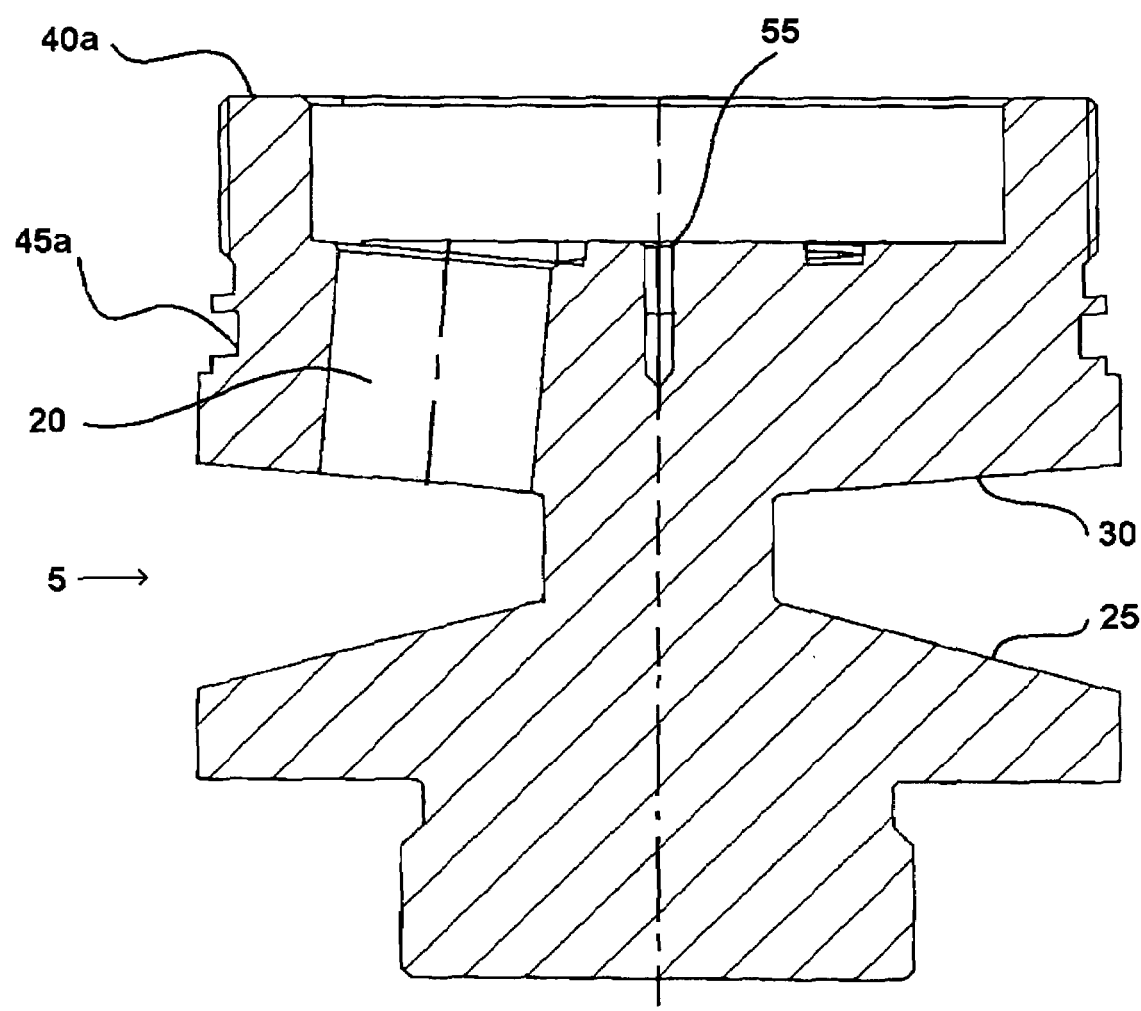
FIG. 2a depicts a cross-sectional side view of the bottom section of an embodiment of a housing of a detection apparatus with multiple sensor holes.
Figure 2B:
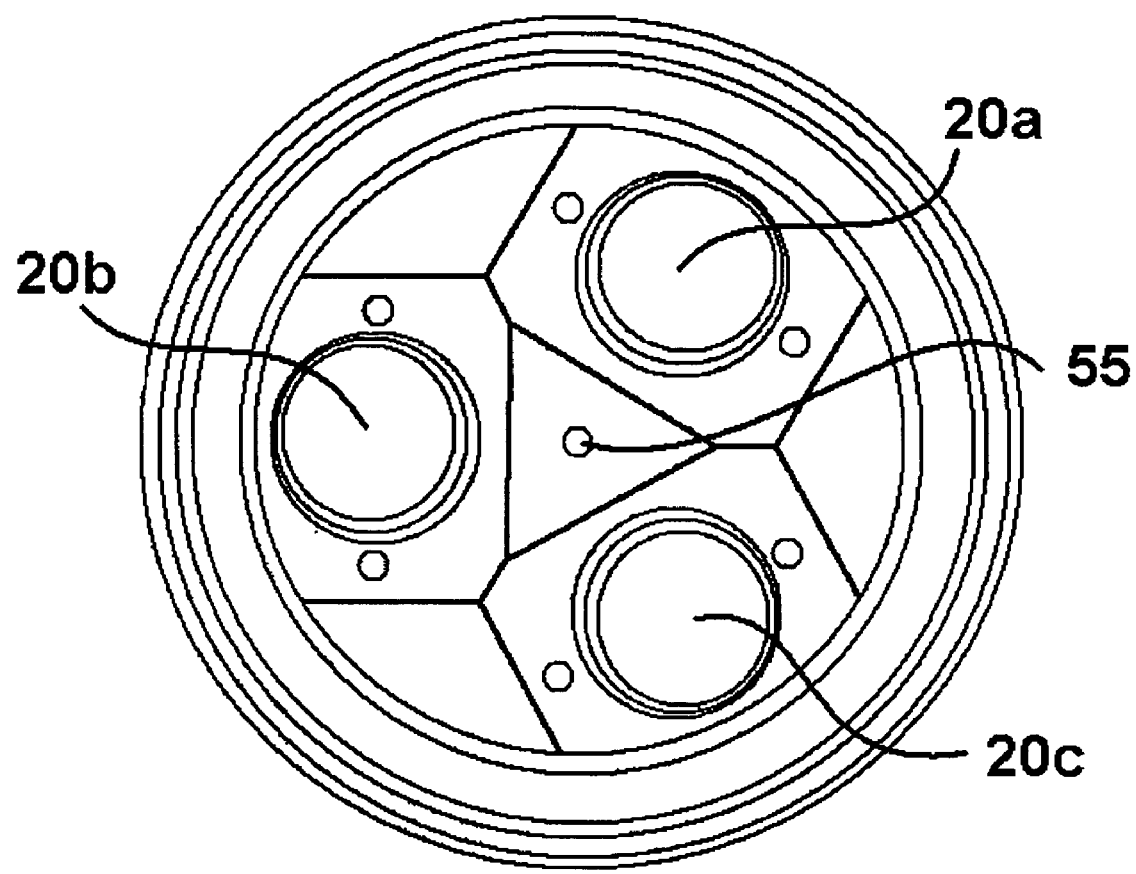

The housing includes sensors disposed in the walls of the hole (20). FIG. 2a depicts a cross-sectional side view of the bottom section of an embodiment of a housing of a detection apparatus with multiple sensor holes. FIG. 2b depicts a top view of the embodiment depicted if FIG. 2a. FIG. 2a and FIG. 2b depict an embodiment with three sensors holes (20a, 20b, and 20c). The sensors are for synchronous and continuous measuring and monitoring or for redundancy. The sensors can be a combination of analog and digital sensors, or the sensors can be analog sensors, only. The sensors provide readings and measurements performed in synchronization and in real-time for increased accuracy. As an example, a pressure sensor usable in the hole of the detection apparatus for use in the vessel can be a piezo-resistive sensor with current or voltage excitation. As depicted in FIG. 2a and FIG. 2b, multiple holes can be drilled in the housing, wherein each hole can contain only a temperature and pressure sensor or combinations of two sensors. Each hole should extend from the top of the housing to the sloped upper surface of the housing, as depicted in FIG. 1a and FIG. 2a. FIG. 1b and FIG. 2b further depict threaded holes (22a and 22b), if needed, next to the sensor holes for sensor attachment.

Using multiple sensors in the housing provides redundancy that, in turn, can minimize downtime for maintenance. The enhanced detection provided by the embodied apparatus can aid in preventing toxic spills quickly and efficiently since leaks can be detected much quicker than before.

In another embodiment, the detection apparatus can have a sensor located above the roof of a vessel and a sensor located within an interior of the vessel for simultaneous measurements of the gas and vapor pressure above and below the roof for the purposes of structural roof damage prevention/alarming and gathering data for hydrocarbon emissions control.

The signaling device can be disposed in the walls of the hole (20) for communications between sensors and for communications with the processor. Examples of signaling devices usable with the embodiments include be wires, cables, fiber optics, a wireless link, or combinations thereof. FIG. 1a, FIG. 1b, FIG. 2a, and FIG. 2b depict the communication hole (50) to house the signaling device or devices.

A processor can be located on the top of the apparatus itself. The sensors themselves do not constitute a processor. The embodiments contemplate that the processor can be remotely located to the sensor housing. The processor can receive sensor data from the sensors and convert the sensor data to one or more values via calculation and computation for transmission to an auxiliary device. As an example, the calculation can compare the sensor data to preset limits or predetermined ranges of values that relate directly to the fluid in the vessel, or the type of vapor pressure being monitored. The processor can have memory and data storage for containing those comparative values, and for holding the algorithms for computing whether the monitored data is within the preset limits or ranges.

The processor can transmit the compared values to an auxiliary device with an interface, such as a graphical user interface and an interactive display, for displaying the calculated values and compared calculated values to a user. The processor can transmit using frequency transmissions; wireless transmissions; cellular transmissions; a network connection, such as Internet transmissions; and combinations thereof.

The auxiliary device can be used for display of the compared calculated values and presentation of alarms, if needed, as in the situation of the calculated values exceeding the preset limits.

The embodiments can include a strain relief rod. The strain relief serves as relief of strain from the cable. The strain relief rod can be a threaded rod, a strap fastener, or another type of strain relief fastener. FIG. 1b and FIG. 2b depicts the hole for the strain relief pin (55).

The embodiments can include a joint sleeve located on an end of the tubular member that is opposite from the attached housing. The joint sleeve can be used for threadably joining the tubular member to a second tubular member to form the extended detection apparatus.

In one embodiment, the detection apparatus can attach to the bottom of a vessel using a magnetic shoe or foot section. The magnetic foot can be used to secure the bottom of the probe on the bottom of the tank, when the bottom is inclined or sloped. In another embodiment, the detection apparatus can be attached to the roof of the vessel by using clamps. In this embodiment, the top mounted bottom reference detection apparatus can hang from the roof of the vessel by using clamps that are secured around the tubular member. The top mounted detection apparatus can attach to vessels with a variety of roofs, such as, cone roofs, or other shaped roofs. In another embodiment, a slipping flange assembly can guide a portion of the detection apparatus through the roof of a vessel to allow roof movement without affecting the detection apparatus.

An embodiment of the detection apparatus can include a scratch resistant base. The scratch resistant base can be made from such materials as: Teflon™, a scratch resistant polymer, and combinations thereof, for protecting the vessel when the bottom mounted detection apparatus is installed. The scratch resistant base can be formed in various shapes, including: a square, a rectangle, an angled-shape, a circle, an oval, and combinations thereof. If there is a conical bottom, a magnetic shoe can be used. A flexible joint can be used to attach to the magnetic shoe.

In one embodiment, the detection apparatus can include a locking integrity bag disposed over a processor of the detection apparatus. The locking bag can be composed of a weather-proof material, such as NOMEX, and can include a radio lock. The radio lock can alarm a user as to a tampering or breach of security, such as the lock has been opened, the bag has been opened, or combinations thereof.

It should be clear that the invention probe can be formed with multiple housings each with multiple sensors. The probes can have between 2 and 150 housings each with multiple sensors are contemplated herein.

While these embodiments have been described with emphasis on the embodiments, it should be understood that within the scope of the appended claims, the embodiments might be practiced other than as specifically described herein.

What is claimed is:

1. A detection apparatus for use in a vessel for measuring a fluid, comprising:
   a housing having a central axis, a housing top with a surface parallel to and beneath the housing top, a housing bottom, an outer surface, and a recess formed in the outer surface; wherein the housing bottom and the housing top are each adapted to couple to a tubular member; and wherein said recess has a upper surface an a bottom surface and where the upper surface is sloped relative to a plane that is perpendicular to the central axis;
   at least one sensor-retaining hole disposed through the top surface at an angle relative to the central axis housing and terminating with the upper surface of the recess;
   at least one pressure sensor mounted in at least one sensor-retaining hole, wherein the pressure sensor comprises a diaphragm that is flush with the upper surface of the recess; and
   signaling means within the housing for communicating sensor data to a processor disposed at a distance from the housing top; wherein the processor comprises memory for receiving sensor data from the signaling means and converting the sensor data to at least one value using computer instructions stored in the memory, and wherein the processor transmits the at least one value to at least one auxiliary device.

2. The detection apparatus of claim 1, where the housing is coupled to a tubular member, and the tubular member is additionally coupled to a sleeve in order to accommodate larger sized objects for monitoring.

3. The detection apparatus of claim 1, wherein the bottom surface of the recess is sloped relative to a plane that is perpendicular to the central axis for allowing fluid to escape the housing.

4. The detection apparatus of claim 1, further comprising
   an additional sensor-retaining hole disposed through the top surface at an angle relative to the central axis housing and terminating with the upper surface of the recess; and
   at least one temperature sensor in the additional sensor-retaining hole; and wherein the signaling means in the housing for communicates temperature sensor data with the processor.

5. The detection apparatus of claim 1, further comprising at least one channel substantially parallel to the central axis of the housing, wherein the at least one channel contains signaling wires to convey sensor data from the signaling means to the processor.

6. The detection apparatus of claim 1, wherein the angle of each sensor-retaining hole ranges from about 0.001 degrees to about 30.0 degrees as measured from the central axis.

7. The detection apparatus of claim 1, further comprising a mounting hole that is parallel to the central axis of the housing, wherein the mounting hole is adapted to receive a strain relief fastener.

8. The detection apparatus of claim 1, further comprising a support to mount the detection apparatus to an upper-portion of the vessel.

9. The detection apparatus of claim 1, further comprising a magnetic base attached to the housing bottom.

10. The detection apparatus of claim 1, further comprising a locking integrity bag disposed over the processor.

11. The detection apparatus of claim 1, wherein the at least one pressure sensor further comprises a temperature sensor.

12. The detection apparatus of claim 1, wherein the processor comprises a clock, and wherein the clock synchronizes data acquisition from the at least one pressure sensor to the processor.

13. The detection apparatus of claim 1, wherein the at least one auxiliary device is a remote terminal unit, a distributive control system, a supervised control and data acquisition system, a computer, a transceiver, a tank gauge interface unit, or combinations thereof.

14. The detection apparatus of claim 1, further comprising from 2 to 150 housings, wherein each housing comprises at least one pressure sensor.

15. The detection apparatus of claim 1, wherein the vessel has a roof and the detection apparatus further comprises a first portion extending above the roof and a second portion below the roof; wherein said first portion comprises sensors for measuring ambient temperature and pressure and said second portion comprises sensors for measuring vapor pressure and vapor temperature.

16. The detection apparatus of claim 1, wherein the slope of the upper surface ranges from about 0.001 degrees to about 30.0 degrees as measured from a plane perpendicular to the central axis.

* * * * *